United States Patent Office 2,850,502
Patented Sept. 2, 1958

---

2,850,502

QUINONE-AMINE CONDENSATION PRODUCTS

Bernard Rudner, Baltimore, Md., assignor to General Aniline & Film Corporation, New York, N. Y., a corporation of Delaware No Drawing. Application September 8, 1955
Serial No. 533,240

12 Claims. (Cl. 260—296)

This invention relates to novel condensation products and to their methods of manufacture. This application is a continuation-in-part of my copending application Serial No. 431,281, now abandoned.

It has been found that novel condensation products may be prepared by condensation of a heterocyclic compound containing a C-amino group in α-position relative to a cyclic nitrogren atom joined to the cyclic C atom through a double bond, with a paraquinone compound in which at least one position ortho to a carbonyl group is unsubstituted in the presence of an alkaline catalyst. The reaction involved may be described in a more specific manner as the condensation of a compound of the formula:

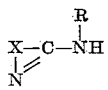

wherein X represents the atoms necessary to complete the cycle and R is selected from the group consisting of H, alkyl, alkoxyalkyl and hydroxyalkyl with a compound of the formula:

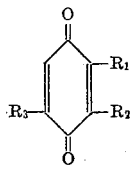

wherein $R_1$ and $R_2$ are selected from the group consisting of H, aliphatic and aromatic radicals, and, when taken together, the atoms necessary to form a cycle; and $R_3$ is selected from the group consisting of H, aliphatic and aromatic radicals.

Illustratively, the mechanism of the reaction between p-benzoquinone and α-aminopyridine in accordance with this invention may proceed as follows:

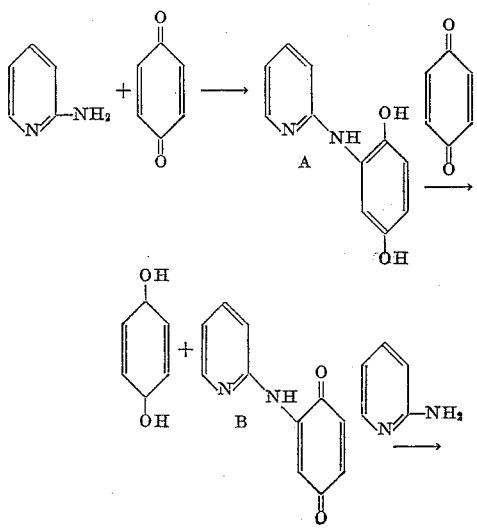

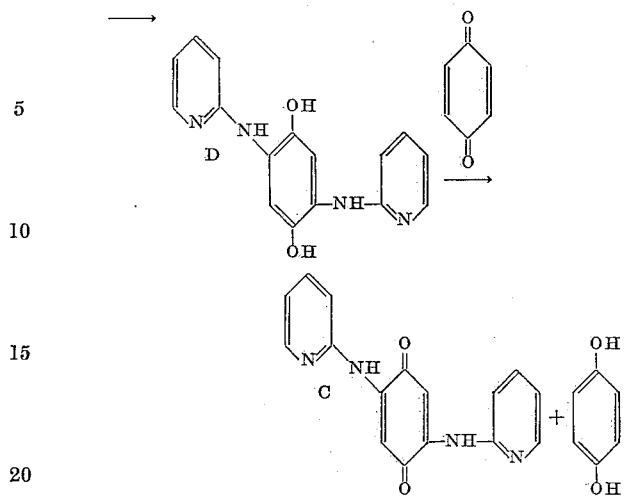

The condensation products of this invention may accordingly be depicted by the formulae:

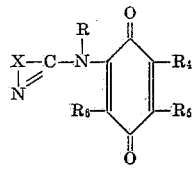

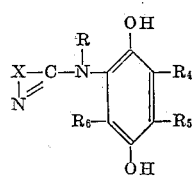

wherein $R_4$ and $R_6$ are selected from the group consisting of H, aliphatic and aromatic radicals, $R_5$ is selected from the group consisting of H, aliphatic, aromatic,

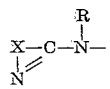

and when taken together with $R_4$, the atoms necessary to form a cycle, and X and R have the values given above.

Since the products of this invention are quite sensitive to outside influences, only mild condensation conditions should be employed. In many cases it is desirable to carry out the condensation and/or the subsequent separation procedures in an inert atmosphere such as for example nitrogen or other oxygen-free medium.

In most cases the condensation proceeds at ordinary room temperature although temperatures from room temperature to reflux temperature of the reaction mass may be used, as long as that temperature is less than about 100° C. Temperatures higher than 100° C. would be apt to result in dehydration and ring closure. The reaction is carried out in anhydrous medium in the presence of an alkaline catalyst. In some few cases, such as α-aminopyridine, the amine is sufficiently basic to act as a self-catalyst. Otherwise, the catalysts include such compounds as tertiary amines, e. g. trimethyl and triethylamine, basic reacting salts of organic acids, e. g. sodium acetate, and basic anhydrous inorganic compounds, e. g. sodium carbonate and sodium hydroxide. The alkaline catalyst is employed in relatively small amounts, its presence effecting a combination catalytic effect plus the establishment of a mild alkaline environment. Reaction time is variable, being in general dependent on other factors such as temperature, concentration and the like.

A good criteria for determining completion of the reaction is usually the disappearance of the odor of quinone.

While equimolar proportions of the reactants may be employed, it is in general preferred to use an excess of quinone, i. e., from about 1 to 4 moles quinone per mole of the α-amino-N-heterocyclic compound. The condensation is carried out in an inert solvent or diluent for the reactants. In general, alcohols such as ethyl and isopropyl may be used, or ether, dioxane, Cellosolve, dimethylformamide, benzene and the like, or mixtures thereof, the main criteria being their ability to hold the reactants in a state of dispersion and to be inert under the conditions of operation.

As quinone compounds which may be employed in the process of the instant invention there may be mentioned p-benzoquinone, toluquinone, methoxyquinone, phenylquinone, paradiphenylquinone, p-naphthoquinone, 2-methyl-1,4-naphthoquinone and the like. The relatively unsubstituted p-quinones are, however, preferred such as p-benzoquinone and p-naphthoquinone. In the quinone formula given above, $R_1$, $R_2$ and $R_3$ may represent H, methyl, ethyl, amyl, lauryl, methoxy, ethoxy, polyethoxy, phenyl, diphenyl and the like. They may be different, or all the same. Where $R_1$ and $R_2$ represent the atoms necessary to form a cycle, the latter cycle may also be substituted by any of the aforementioned radicals.

As the heterocyclic compound containing an amino group in α-position relative to a cyclic N atom, those most suitable in the process of the instant invention are in general pseudoaromatic compounds containing 5 and 6 membered rings containing at least one N-heteroatom in the required configuration (pseudoaromatic α-amino-N-heterocycles). It is to be understood, however, that such rings may contain additional types of atoms, as for example, nitrogen, sulfur, oxygen, selenium, tellurium, and the like. As representative of the types of compounds from which the α-amino-N-heterocyclic compounds of this invention may be selected, there may be mentioned azines such as selenazines, thiazines, oxazines, triazines, diazines, and the like, quinolines, isoquinolines, pyridines and the like, and azoles such as selenazoles, thiazoles, oxazoles, triazoles, tetrazoles, diazoles and the like.

The group required in the α-position relative to the N-heterocyclic atom may be primary amino, or secondary amino such as methylamino, ethylamino, methoxyethylamino, ethoxyethylamino, polyethoxyethylamino, hydroxyethylamino, and the like. By way of example of specific compounds operative in the instant invention, there may be mentioned 2-amino-pyridine, 2-amino-picoline, 2-aminoquinoline, 2-aminothiazole, 2-amino-4-methylthiazole, 2 - amino - 4-ethylthiazole 2-amino-4-phenylthiazole, 2 - aminotetrahydrobenzothiazole, 2-aminobenzothiazole, 2-amino-6-methoxybenzothiazole, 2-amino-6 ethoxybenzothiazole, 2 - aminoimidazole, 2 - aminobenzimidazole, acetoguanamine, benzoguanamine, 2-aminopyrimidine, N-substituted secondary amino derivatives of the foregoing compounds as above described, and the like.

It will be course be understood that the quinone and N-heterocyclic reactants employed in the instant invention may contain insert substituents which do not interfere with the progress of the desired reaction or the properties of the products thereof.

In general, a type A product of this invention is separated from the condensation mixture on the basis of its solubility in acid, the remaining isolable components remaining as solids. Type B product is isolated by alkaline reduction of such solids to A, followed by solution in acid, followed by reoxidation to B. Type C product is obtained by oxidation of the solids remaining after A has been dissolved out of the reduction mass. Type D product, the reduced form of C, must be carefully treated in any attempt to isolate it out of its solution, being highly unstable and readily oxidized in air.

The following examples, in which parts and proportions are by weight unless otherwise indicated, are illustrative of the instant invention and are not to be regarded as limitative.

Example 1

10 g. 2-aminopyridine and 10 g. p-benzoquinone in 250 cc. ethanol were treated with 5 drops triethylamine and allowed to stand overnight. The entire reaction mixture was evaporated to a dark tar. Trituration with 200 cc. N. HCl at 50° C. converted the charge to a rich brown residue and a red filtrate.

This red filtrate, contains A. It is purified by being made alkaline to phenolphthalein with caustic, treated with .5 g. sodium hydrosulfite, treated with Nuchar 20 minutes at 20–25° C., clarified and brought to weak Brilliant Yellow alkalinity with HCl which precipitated a khaki-colored solid (IA) which weighed approximately 4 g. after being vacuum dried at 80° C. On the basis of analysis and chemical tests, IA was believed to have the formula:

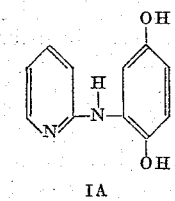

IA

It was obtained as an off-white to a light tan solid by intensive purification making use of chromatographic absorption using an alumina column in an oxygen-free atmosphere (nitrogen). When freshly purified it is soluble in common organic solvents, in acid and alkali. A neutral solution showed fluorescence under ultra-violet light with a strong absorption peak at 2430 A. The product decomposed without a sharp melting point at about 200° C. It is oxidized in air, especially in alkaline solution, to complex mixtures of dark solids.

The original rich brown residue obtained above which presumably contains IB, IC and possibly ID, weighing approximately 7 g. was dissolved in 150 cc. N. NaOH, maintained at 85–90° C. for 30 minutes and then treated with 7 g. sodium hydrosulfite. It was treated with Nuchar, clarified and precipitated at 25–30° C. by making very weakly alkaline to Brilliant Yellow with HCl. Approximately 4 g. of a shiny light olive-colored solid was obtained. This is believed to be ID, the reduction product of IC. This product was acid insoluble and unstable and oxidized readily to a product, IC, which was determined to have the formula:

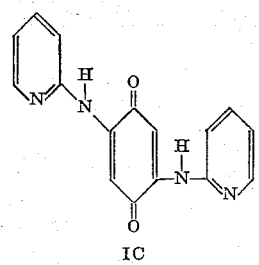

IC

The original rich brown residue obtained above has been shown to be a mixture of IC and IB, which latter is the oxidation product of IA, i. e.

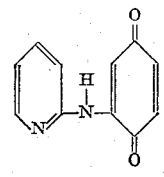

IB and is present in an approximate ratio of 6:1. Some unstable ID may also be present.

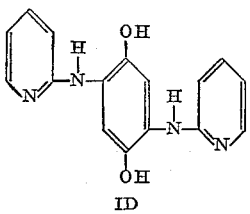

ID

To show this, the residue was reduced with hydrosulfite. The reduced IB, which is IA, is acid soluble and was dissolved in acid, leaving a solid, possibly ID, which quickly turned dark brown, forming IC.

The reduced IB, which is IA, was readily oxidized with $FeCl_3$ (although air will do it) to IB. IB is a yellowish-brown solid which melts with decomposition over a range of about 5° C. beginning approximately at 126° C. IB was appreciably soluble in organic solvents and alkali (with marked color development), but not in dilute acid.

The IC did not melt below 250° C., was less soluble in common solvents than IB, but was soluble in alkali with the formation of a dark red brown solution.

*Example 2*

The process of Example 1 was repeated but replacing the 2-aminopyridine by 11 g. 4-methyl-2-aminopyridine. Similar products were obtained.

*Example 3*

To 11.5 g. 2-aminothiazole and 5 drops triethylamine in 250 cc. ethanol were added at about 40-50° C. 10 g. p-benzoquinone over a period of about 30 minutes. The dark solution was held at 60° C. for 30 minutes, and then evaporated on the steam bath to a black tar. By the method detailed in Example 1, there were obtained, in approximately a 3:1:7 ratio:

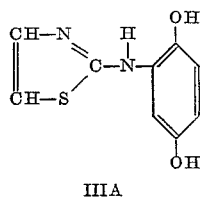

IIIA

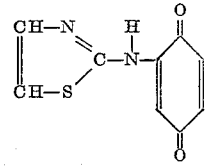

IIIB

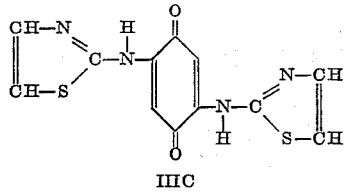

IIIC

These products showed somewhat less stability than those of Example 1. IIIA was a light tan solid soluble in common solvents, acid and alkali. It decomposed on melting at about 190° C. Its neutral solution showed fluorescence under ultraviolet light with marked absorption at 2540 A. The corresponding quinone, IIIB, darkened on exposure to air, and decomposed with questionable melting at about 130° C. The disubstituted quinone IIIC gave an acid insoluble hydroquinone which oxidized readily in air, could not be obtained in a high state of purity and decomposed without melting at about 250° C.

*Example 4*

16 g. 2-aminobenzimidazole and 10 g. p-benzoquinone were condensed and yielded approximately 4 g. IVA, 1 g. of the corresponding quinone IVB, and 4 g. of IVC.

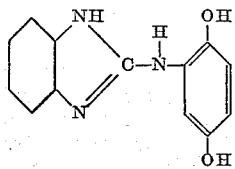

IVA

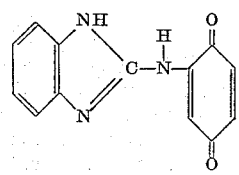

IVB

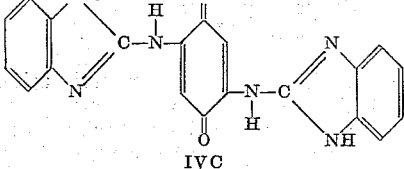

IVC

IVA was a cream to light tan solid which decomposed at approximately 212–218° C. It could be oxidized by $FeCl_3$ to IVB, a golden-brown amorphous solid which decomposed at approximately 250° C. Strong oxidizing agents converted IVA to a mixture of products, including p-benzoquinone. The disubstituted quinone IVC, which decomposed above 250° C. was a dark brown solid moderately soluble in alcohol. Its alkaline hydrosulfite reduction product was a yellowish-brown solid, relatively soluble in common organic solvents and having greater stability than the IIIC hydroquinone.

*Example 5*

A solution of 19 g. 2-amino-6-ethoxybenzothiazole and 0.4 g. solid NaOH in 500 cc. alcohol was deaerated by bubbling nitrogen through it for 15 minutes. A similarly deaerated solution of 10.8 g. benzoquinone in 250 cc. alcohol was then added, at 50° C., over a period of 25 minutes. The rapidly darkening solution was kept at 45–50° C. for 35 minutes while being stirred with a stream of nitrogen gas, then treated with 5 cc. 50% acetic acid. The solvent was evaporated off. Separation and isolation, as described in previous examples, yielded approximately 6 g. of off-white product believed to be VA, approximately 2 g. of a product believed to be VB, and approximately 8 g. of a mixture which was largely VC.

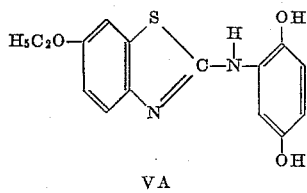

VA

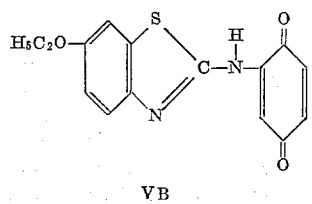

VB

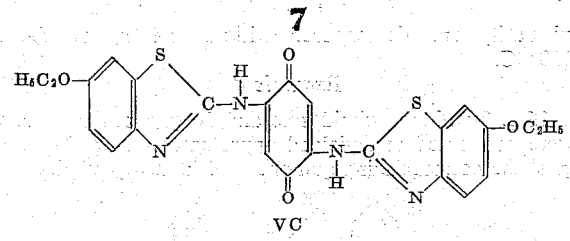

VC

VA, an off-white solid, melts at approximately 182° C. Its solutions in organic solvents show marked fluorescence and it appears to be more resistant to oxidation than IA, although less so than IVA. Prolonged hot acid treatment of VA converted it to a mixture in which hydroquinone, benzophenone and aminoethoxybenzothiazole could be identified.

VB, a brown solid, melts at approximately 193° C., with a weak, but unmistakable quinone odor. It was readily reduced by either iron plus HCl or alkali hydrosulfite to VA. It was more readily cleaved by hot concentrated HCl to its constituents than was VA. On allowing a solution of 0.3 g. VB, 0.1 g. 2-amino-6-ethoxybenzoquinone and a drop of triethylamine in 15 cc. ethanol to stand overnight at 40° C., a brown mixture was produced which, by chromatography, was shown to contain approximately 30% of a solid the spectrophotometric curve of which was identical with that of VC.

VC, obtained in mixture as its sulfuric acid-insoluble reduction product, was purified by chromatographic adsorption. It was then air-oxidized back to the quinone. It was a dark brown solid which melted with decomposition at about 210° C. It appeared to be more soluble than IVC in common organic solvents, but less so than VA and VB. Hot acid treatment of its solutions cleaved it about as readily as VB.

Example 6

10 g. 2-aminopyridine in 250 cc. isopropyl alcohol containing 0.4 g. dissolved NaOH was aerated by a slow stream of air at room temperature for 5 minutes, and then treated over a 30 minutes period with a solution of 14 g. hydroquinone in 250 cc. isopropyl alcohol. The dark solution was aerated at room temperature for an additional 4 hours, while the volume was maintained by additional solvent. The mixture was allowed to stand overnight, filtered free of insolubles and treated with 1 cc. glacial acetic acid. Working up as in Example 1 gave similar products, but in lower yields.

The following series of condensations was run, with the stated results:

preparation of other compounds as disclosed in my copending application Serial No. 533,241 filed on even date herewith. Type C products (and also oxidation products of Type D products) are useful as vat dyes for dyeing wool from an acid bath. These dyeings may be metallized if desired. The type C compounds are also useful as intermediates for the production of dyestuffs of the dioxazine series, by heating in a high boiling solvent followed, if desired, by sulfonation. For example, they may be ring-closed to the dioxazine dyestuff type by refluxing in nitrobenzene, cooling, filtering, washing and drying. Such dyestuffs may be used as such, or they may be sulfonated in known manner to yield dyestuffs for cotton and other fibers.

While this invention has been described with respect to certain preferred embodiments thereof, various modifications and variations thereof will become obvious to the person skilled in the art. It will be understood that such modifications and variations are to be included within the spirit and purview of this application and the scope of the appended claims. Claims directed to the reduced form of product are intended to include the equivalent oxidized form thereof.

I claim:

1. A process which comprises condensing 1 to 2 moles of a compound of the formula $$\underset{N}{X-\overset{R}{\underset{|}{C}}-NH}$$

wherein X represents the atoms necessary to form 5- and 6-membered heterocyclic rings containing an atom of the class consisting of nitrogen, sulfur, oxygen, selenium, and tellurium and nuclearly substituted lower alkyl, lower alkoxy, phenyl, benzo, lower alkylamino, lower alkoxyamino and hydroxy lower alkylamino derivatives thereof, and R is selected from the group consisting of hydrogen, lower alkyl, lower alkoxyalkyl, and lower hydroxyalkyl, with 1 mole of a compound of the formula:

$$R_3-\begin{array}{c}O\\ \| \\ \diagup\!\!\!\diagdown \\ \diagdown\!\!\!\diagup \\ \| \\ O\end{array}\begin{array}{c}-R_1\\ -R_2\end{array}$$

wherein $R_1$, $R_2$, and $R_3$ are selected from the group con-

| Ex. No. | Amine | Quinone | Ratio of product types obtained | | | Description of A |
|---|---|---|---|---|---|---|
| | | | A | B | C | |
| 7 | 2-amino-4-methyl thiazole | p-Benzoquinone | 2 | 1 | 2 | Melts at 131–142° C. with decomposition. |
| 8 | 2-amino-4-phenyl-thiazole | ___do___ | 4 | 1 | | Melts at 177–183° C. with decomposition. |
| 9 | 2-amino-4-5-6-7 tetrahydrobenzothiazole | ___do___ | 3 | 2 | | Melts at 136–151° C. with decomposition. |
| 10 | 2-aminobenzo-thiazole | ___do___ | 4 | 1 | 3 | Melts at over 161° C. with decomposition. |
| 11 | 2-amino-6-ethoxybenzothiazole | ___do___ | 4 | 1 | 3 | Melts at over 158° C. with decomposition. |
| 12 | 2-aminothiazole | 1,4-naphthoquinone | 1 | | | Melts at over 200° C. with decomposition. |
| 13 | ___do___ | 2-toluquinone | 3 | 2 | | Melts at over 121° C. with decomposition. |
| 14 | Acetoguanamine | p-Benzoquinone | 1 | (¹) | (¹) | Melts at over 250° C. with decomposition. |
| 15 | Benzoguanamine | ___do___ | 1 | (¹) | (¹) | Similar to 12. |
| 16 | 2-amino-pyrimidine | ___do___ | 1 | | 1 | Melts at approximately 150° C. with decomposition; relatively resistant to air oxidation. |

¹ Mixture.

Type B products (oxidation products of Type A) of the instant invention, and their bisulfite addition products are useful for dyeing wool from an acetic acid bath. The resulting dyeings may be metallized if desired. Moreover, such products wherein a thiazole is employed as the heterocyclic reactant are useful as intermediates for the sisting of hydrogen, lower alkyl, lower alkoxy, lower polyalkoxy, aryl hydrocarbon of no more than 10 carbon atoms, and when $R_1$ and $R_2$ are taken together, the atoms necessary to form a six-membered carbocycle, in an anhydrous medium at a temperature below about 100° C. and in the presence of an alkaline catalyst.

2. A compound selected from the group consisting of compounds of the formula:

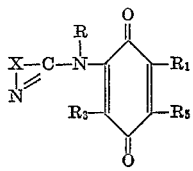

wherein X represents the atoms necessary to form 5- and 6-membered heterocyclic rings containing an atom of the class consisting of nitrogen, sulfur, oxygen, selenium and tellurium and nuclearly substituted lower alkyl, lower alkoxy, phenyl, benzo, lower alkylamino, lower alkoxyamino and hydroxy lower alkylamino derivatives thereof, R is selected from the group consisting of hydrogen, lower alkyl, lower alkoxyalkyl, and lower hydroxyalkyl, $R_1$ and $R_3$ are selected from the group consisting of hydrogen, lower alkyl, lower alkoxy, lower polyalkoxy, and aryl hydrocarbon of no more than 10 carbon atoms, and $R_5$ is selected from the group consisting of hydrogen, lower alkyl, lower alkoxy, lower polyalkoxy, aryl hydrocarbon of no more than 10 carbon atoms.

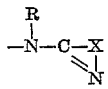

and, when taken together with $R_1$, the atoms necessary to form a six-membered carbocycle, and the reduced lenco forms of such compounds.

3. A process for producing a compound as defined in claim 8 comprising condensing 2-aminopyridine with p-benzoquinone in an anhydrous medium at a temperature below about 100° C. and in the presence of an alkaline catalyst.

4. A process for producing a compound as defined in claim 9 comprising condensing 4-methyl-2-aminopyridine with p-benzoquinone in an anhydrous medium at a temperature below about 100° C. and in the presence of an alkaline catalyst.

5. A process for producing a compound as defined in claim 10 comprising condensing 2-aminothiazole with p-benzoquinone in an anhydrous medium at a temperature below about 100° C. and in the presence of an alkaline catalyst.

6. A process for producing a compound as defined in claim 11 comprising condensing 2-aminobenzimidazole with p-benzoquinone in an anhydrous medium at a temperature below about 100° C. and in the presence of an alkaline catalyst.

7. A process for producing a compound as defined in claim 12 comprising condensing 2-aminothiazole with 1,4-naphthoquinone in an anhydrous medium at a temperature below about 100° C. and in the presence of an alkaline catalyst.

8. A compound of the formula

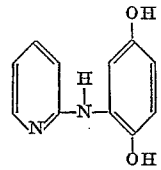

9. A compound of the formula

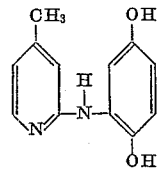

10. A compound of the formula

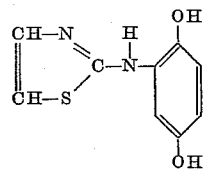

11. A compound of the formula

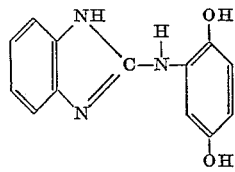

12. A compound of the formula

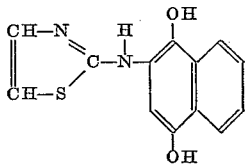

References Cited in the file of this patent

Pratesi, Chem. Abst., vol. 31, page 1025 (1937).
Schmid et al., Chem. Abst., vol. 46, col. 11185 (1952).